United States Patent [19]

Kim

[11] Patent Number: 5,400,638
[45] Date of Patent: Mar. 28, 1995

[54] CALIBRATION SYSTEM FOR COMPENSATION OF ARM LENGTH VARIATION OF AN INDUSTRIAL ROBOT DUE TO PERIPHERAL TEMPERATURE CHANGE

[75] Inventor: Mun Sang Kim, Seoul, Rep. of Korea

[73] Assignee: Korea Institute of Science and Technology, Seoul, Rep. of Korea

[21] Appl. No.: 281,233

[22] Filed: Jul. 27, 1994

Related U.S. Application Data

[63] Continuation-in-part of Ser. No. 992,072, Dec. 17, 1992, abandoned.

[30] Foreign Application Priority Data

Jan. 14, 1992 [KR] Rep. of Korea ............. 424/1992

[51] Int. Cl.$^6$ ............................................. B25J 1/00
[52] U.S. Cl. ......................................................... 73/1 J
[58] Field of Search ............... 73/1 J; 901/47; 33/567, 33/502, 544

[56] References Cited

U.S. PATENT DOCUMENTS

| | | | |
|---|---|---|---|
| 4,668,157 | 5/1987 | Kato et al. | 901/46 |
| 4,685,054 | 8/1987 | Manninen et al. | 901/47 |
| 4,932,136 | 6/1990 | Schmitz et al. | 73/1 J |
| 5,125,261 | 6/1992 | Powley | 73/1 J |
| 5,198,876 | 3/1993 | Anezaki et al. | 901/47 |

FOREIGN PATENT DOCUMENTS

| | | | |
|---|---|---|---|
| 0276725 | 11/1990 | Japan | 901/47 |
| 0039611 | 2/1991 | Japan | 33/644 |

*Primary Examiner*—Robert Raevis
*Attorney, Agent, or Firm*—Scully, Scott, Murphy & Presser

[57] ABSTRACT

A calibration system for compensating variation of robot arm length of an industrial robot because of temperature change. The system comprises a temperature variation insensible calibration jig having a pair of rectangular hexahedrons of different sizes which are combined with each other above and below and have a plurality of measuring points marked thereon. A noncontact sensor unit relatively measures a teach-in measuring point of the calibration jig and compares the measured value of the teach-in point with initially inputted value thereof, thereby calculating the variation of the robot arm length caused by the temperature change. The noncontact sensor unit includes a camera for measuring a center of the teach-in measuring point and a laser displacement sensor (LDS) for measuring relative distance between the robot hand and the teach-in measuring point and sensing three-dimensional relative error. The arm length variation is calculated, using differential value between the initially inputted value and the measured value of the teach-in measuring point, in accordance with the method of least squares.

4 Claims, 2 Drawing Sheets

CALIBRATION SYSTEM FOR COMPENSATION OF ARM LENGTH VARIATION OF AN INDUSTRIAL ROBOT DUE TO PERIPHERAL TEMPERATURE CHANGE

This application is a continuation-in-part patent application of Ser. No. 07/992,072, filed on Dec. 17, 1992, now abandoned.

BACKGROUND OF THE INVENTION

1. Field of the Invention

The present invention relates in general to a calibration system of an industrial robot, and more particularly to an improved calibration system for compensation of arm length variation of the industrial robot in which the arm length variation caused by operational peripheral temperature change is detected by a noncontact sensor unit and automatically compensated in order to make the varied position of the tool center point mounted on a distal end of a robot hand to precisely return to its preset reference position with respect to a workpiece.

2. Description of the Prior Art

Conventionally, there occasionally occurs arm length variation of a known industrial robot because of peripheral temperature change of the automatic production line equipped with the industrial robots, as a result, a tool center point mounted on a distal end of a robot hand of the robot arm is deviated from the preset reference position thereof with respect to a workpiece to be machined. In this respect, a problem of the known industrial robot is resided in that the operational accuracy of the robot, which is taken a serious view of the automatic production using the industrial robots, is necessarily reduced and this causes quality of the result product of the automatic production to be deteriorated.

In result, in order to repeatedly carry out the automatic workpiece machining, using the industrial robots, with provision of such a desired operational accuracy, it is required to detect the arm length variation of the industrial robot caused by the peripheral temperature change and compensate the arm length variation in order to make the tool center point of the robot hand to return to its preset reference position from the detected varied position. In order to accomplish the aforementioned object, two known methods have been typically used. Otherwise stated, the automatic production line equipped with industrial robots is installed in a constant temperature room wherein the operational temperature can be maintained constant or the arm length variation caused by the operational peripheral temperature change is detected by a sensor and forcedly compensated in order to cause the varied position of the tool center point of the robot hand to be returned to the preset reference position with respect to the workpiece.

However, in the case of use of a part of the industrial robot as such a sensor for detecting the arm length variation, it may be impossible to install the constant temperature room for the industrial robots or to compensate the robot arm length variation by means of a conventional camera system for sensing and compensating the arm length variation. In this respect, the known methods for overcoming the robot arm length variation due to the peripheral temperature variation have a problem in that they, irrespective of their types, can not accomplish the compensation of arm length variation of the robot in such a case, or the case of use of a part of the robot as the arm length variation sensor.

SUMMARY OF THE INVENTION

It is, therefore, an object of the present invention to provide a calibration system for compensation of arm length variation of the industrial robot due to operational peripheral temperature change in which the aforementioned problem introduced by the known methods can be overcome by sensing and precisely compensating the arm length variation of the robot even when a part of the robot is used as the arm length variation sensor.

In accordance with the present invention, the compensation of the robot arm length variation because of the temperature variation is carried out by measuring, using a noncontact sensor unit comprising a camera and a laser displacement sensor (hereinafter, referred to simply as "LDS") both mounted on a distal end of the robot hand, relative distance between the distal end of the robot hand and a calibration jig in order to calculate three-dimensional relative error value and determine, based on this relative error value, the arm length variation of the robot because of the operational peripheral temperature change and compensating the robot arm length in accordance with the above determination of arm length variation.

In an embodiment, the calibration system of this invention comprises a noncontact sensor unit having a camera fixedly mounted on a robot hand and a temperature variation insensible calibration jig, the latter being disposed in order to be vertically spaced apart from the former by a predetermined distance. Here, the noncontact sensor unit comprises the camera for determining two-dimensional position of a designated point a screen and a LDS for measuring a relative distance by determination of a distance therefrom to a measuring object in accordance with trigonometry.

Meanwhile, the calibration jig, insensible of temperature variation and disposed in order to be opposite to the noncontact sensor unit, comprises a pair of rectangular hexahedrons of different sizes which overlap above and below. In addition, in order to cause the hexahedrons to be precisely sensed by the camera, the upper hexahedron has five circular measuring black points, each of which is marked at a center of each exposed surface thereof, while the lower hexahedron has twelve circular measuring black points, each three points of which are marked at three exposed surfaces of each corner.

Here, the variation of the robot arm length due to the temperature change is calculated in accordance with the method of least squares using differential value between an initially inputted value of a teach-in measuring point marked on the calibration jig and a measured value of the teach-in measuring point.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
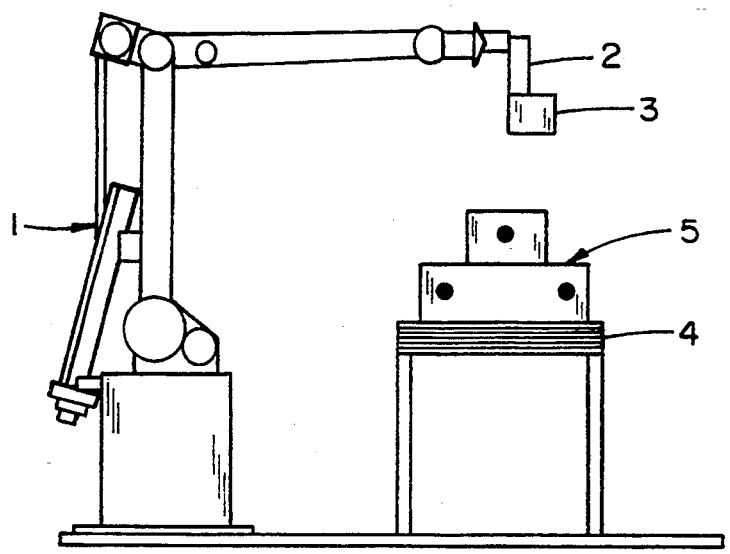
FIG. 1 is an elevational view of a calibration system for an industrial robot in accordance with the present invention.

Referring now to FIG. 1 showing a preferred embodiment of a calibration system for sensing and compensating a robot arm length variation of an industrial robot in accordance with the present invention, the present calibration system includes a noncontact sensor unit 3 which is mounted on a distal end of a robot hand 2 of the industrial robot 1 and comprises a camera 3a and a laser displacement sensor (LDS) 3b. In addition, a two-stepped, temperature variation insensible calibration jig 5, comprising a pair of rectangular hexahedrons having different sizes and combined with each other above and below, is laid on a support die 4 which is disposed below the robot hand 2, having the noncontact sensor unit 3, with a space therebetween. Here, the robot hand 2 is taught-in such that it is perpendicular to each measuring point 5a' marked on each surface of the rectangular hexahedrons of the calibration jig 5. In this state, the industrial robot 1 travels along the teach-in measuring points 5a' and periodically stops at each measuring point 5a' and, at the stopped state, carries out its sensing operation which will be in detail described below in conjunction with FIGS. 2 to 4.

Figure 2:
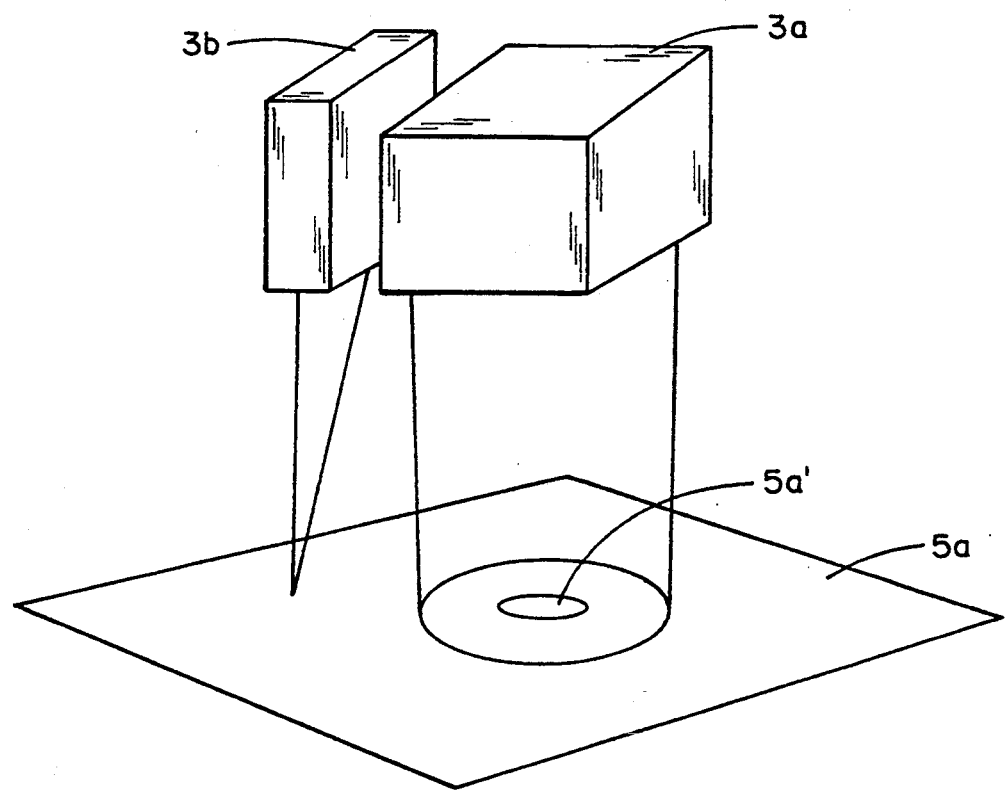
FIG. 2 is an enlarged perspective view of a noncontact sensor unit of the calibration system of FIG. 1.
Figure 3:
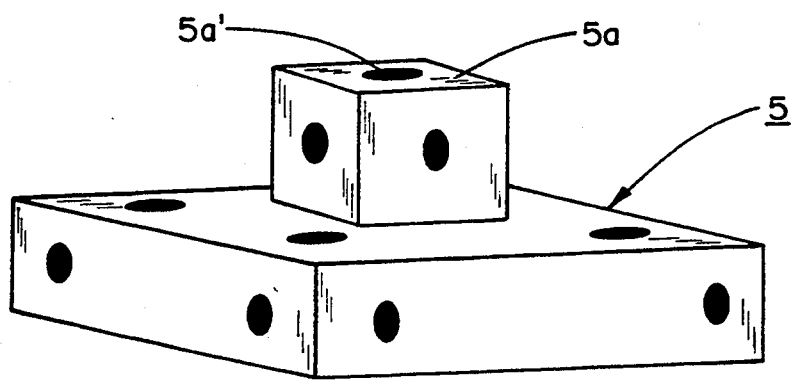
FIG. 3 is an enlarged perspective view of a calibration jig of the calibration system of FIG. 1.
Figure 4:
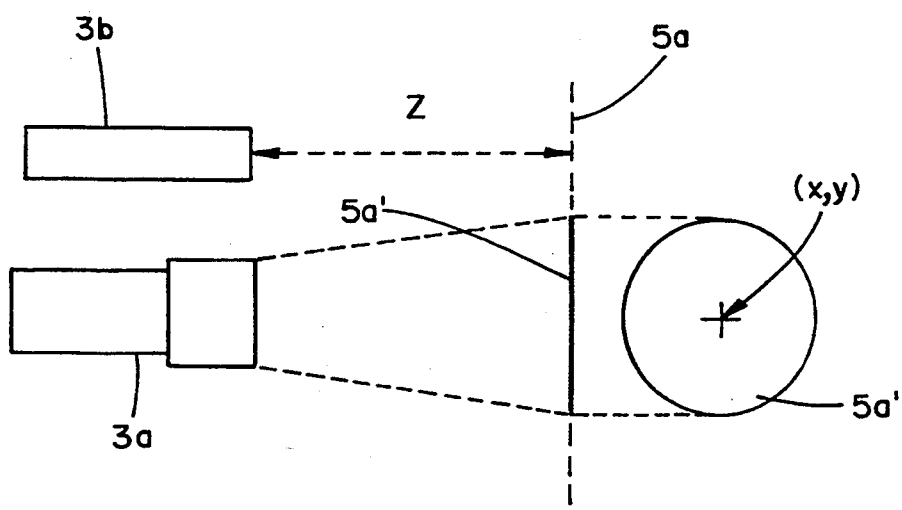
FIG. 4 is a schematic view showing the measuring theory of the calibration system of the present invention.

FIG. 2 shows a construction of the noncontact sensor unit 3 of the present calibration system in sensing state, FIG. 3 shows the two-stepped calibration jig 5 and FIG. 4 represents the measuring theory of the present calibration system. As depicted in these drawings, the measuring operation of this calibration system is carried out in noncontact type by means of the camera 3a and LDS 3b of the noncontact sensor unit 3. In order to carry out the measuring operation of this invention, the camera 3a of the sensor unit 3 is taught-in so as to be perpendicular to one of the black measuring points 5a' marked on the exposed surfaces 5a of the two-stepped calibration jig 5 and, in this respect, senses two-dimensional position of the calibration jig 5. Meanwhile, the LDS 3b integrally combined with the camera 3a measures a distance from the sensor unit 3 to the sensing object in accordance with the trigonometry, or a relative distance between the robot hand 2 and the calibration jig 5, thereby calculating three-dimensional relative error with respect to the teach-in measuring point 5a'.

Otherwise stated, the camera 3a of the sensor unit 3 measures the center of the teach-in measuring point 5a' of the calibration jig 5, while the LDS 3b measures the relative distance between the robot hand 2 and the surface 5a on which the black measuring point 5a' is marked. As a result, the three-dimensional position of the measuring point 5a' of the calibration jig 5 is determined.

On the other hand, the central coordinates x, y of the measuring point 5a' marked on the plane surface 5a of the calibration jig 5 is two-dimensionally determined by the camera 3a, while the relative distance Z between the tip of the LDS 3b and the plane surface 5a of the calibration jig 5 is measured by the LDS 3b.

At this time, the position of the black measuring point 5a' is not required to be precisely determined and the size of each measuring point 5a' is not limited.

Practically, the differential value between the value practically measured during the robot operation and the initially preset reference value is represented as the three-dimensional relative error of x, y and z directions. This differential value represents three-dimensional micro-variation of the distal end of the robot hand 2 which is caused by the variation of the robot arm length because of the operational peripheral temperature change and, in this respect, the above differential value permits the variation of the robot arm length to be reckoned backward.

Here, the algorithm of the inverse operation of the robot arm length variation using the differential value between the value practically measured during the robot operation and the initially preset reference value is described as follows:

The kinematic transformation of the robot arm which is an important factor for determining kinematics of machinery of the robot is expressed by the following expression 1.

$$\underline{x} = f(\underline{\theta}, \underline{l}) \tag{1}$$

wherein $\underline{x}$ is cartesian coordinates of the distal end of the robot hand, $\underline{\theta}$ is variation of the robot arm joint and $\underline{l}$ is a length of each link.

Here, let the three-dimensional error value resulted from substraction of the three-dimensional measuring value, determined by measurement of a point of the calibration jig after occurrence of the robot arm length variation due to the operational peripheral temperature change, from the teach-in measuring value be $\Delta \underline{l}$, the relation between the two variables $$\Delta \underline{x} = \partial/\partial \underline{l} \cdot f(\underline{\theta}, \underline{l}) \cdot \Delta \underline{l} = J(\underline{\theta}) \Delta \underline{l} \tag{2}$$

wherein the expression $J(\underline{\theta}) = \partial/\partial \underline{l} \cdot f(\underline{\theta}, \underline{l})$ is generally named as Jacobian matrix and expresses the linear relation between the robot arm length variation $\Delta \underline{x}$ and the three-dimensional error value $\Delta \underline{l}$.

From the above expression (2), equations for values determined at k different positions can be generally expressed by the following expression (3).

$$\Delta \underline{x}_i = J(\underline{\theta}_i) \cdot \Delta \underline{l} \tag{3}$$

wherein i = 1, 2, ..., k−1, k.

Meanwhile, the k equations expressed by the above general equation (3) can be also expressed by the following expression $$\Delta \underline{X} = \begin{bmatrix} \Delta \underline{x}_1 \\ \Delta \underline{x}_2 \\ \cdot \\ \cdot \\ \cdot \\ \Delta \underline{x}_k \end{bmatrix} ; (3k, l) \text{ matrix}$$

$$J = \begin{bmatrix} \underline{J(\theta_1)} \\ \underline{J(\theta_2)} \\ \cdot \\ \cdot \\ \cdot \\ \underline{J(\theta_k)} \end{bmatrix} ; (3k, n) \text{ matrix}$$

$\Delta \underline{l} = (n, l)$ vector and
$\underline{x}, \Delta \underline{x} \in R^3$; $\Delta \underline{x} \in R^{3k}$; $J \in R^{3k \times n}$ wherein R can be any number in the real number domain.

In result, in order to calculate the three-dimentional error value $\Delta \underline{l}$, sufficient times of measurements satisfying the conditions of $3k \geq n$ must be carried out.

If the above measuring condition is satisfied, it is possible to calculate the variable $\Delta \underline{l}$, which makes the result of $\|\Delta \underline{X} - J \cdot \Delta \underline{l}\|$ be minimized, in accordance with the method of least squares.

On the other hand, when the matrix J is not singular, it is possible to calculate the three-dimensional error value $\Delta \underline{l}$ by the following expression, $$\Delta \underline{l} = (J^T J)^{-1} \cdot J^T \Delta \underline{X}$$

wherein T is a operational peripheral temperature (°C.).

Otherwise stated, the three-dimensional error value $\Delta \underline{l}$ is defined as the arm length variation caused by the temperature variation.

The result of the above expressions are used for the expression 91), determining kinematics of machinery of the industrial robot, in order to provide new kinematics of machinery of the robot, thereby making it possible to compensate the variation of the robot arm length because of the operational peripheral temperature chanbe.

As described above, the present invention provides a calibration system for compensation of arm length variation of the industrial robot caused by operational peripheral temperature change which senses and precisely compensates the arm length variation of the robot equipeed in an automatic production line even when a part of the robot is used as an arm length variation sensor.

Although the preferred embodiments of the present iinvention have been disclosed for illustrative purpose, those skilled in the art will appreciate that various modifications, additions and substitutions are possible, without departing from the scope and spirit of the invention as disclosed in the accompanying claims.

What is claimed is:

1. A calibration system for compensating variation of robot arm length of an industrial robot due to temperature change comprising:
    a calibration jig insensitive to temperature variation having a plurality of measuring points; and
    a noncontact sensor unit for relatively measuring a teach-in measuring point of said calibration jig and comparing the measured value of said teach-in point with an initially preset reference value thereof, thereby identifying the differential change of the robot arm length parameter due to the temperature change, said noncontact sensor unit including a camera and a laser displacement sensor which are mounted on component of said industrial robot.

2. A calibration system according to claim 1, wherein said calibration jig comprises a pair of rectangular hexahedrons having different sizes and combined with each other above and below, and said measuring poinsts are black points marked on surfaces of said rectangular hexahedrons.

3. A calibration system according to claim 1, wherein said camera of the noncontact sensor unit measures a center of said teach-in measuring point of the calibration jig and said laser displacement sensor measures relative distance between said robot hand and a calibration jig surface, on which said teach-in measuring point is marked, and senses three-dimensional relative error.

4. A calibration system according to claim 1, wherein the differential change of the robot arm length parameter is identified in accordance with the method of least squares by using differential value between an initially preset reference value of a teach-in-measuring point marked on the calibration jig and a measured value at the same point.

* * * * *